Dec. 2, 1958     B. B. BLACKFORD ET AL     2,862,846
METHOD OF MAKING PLASTIC STRIP ADHESIVE BANDAGES
Filed Nov. 23, 1953     3 Sheets-Sheet 1
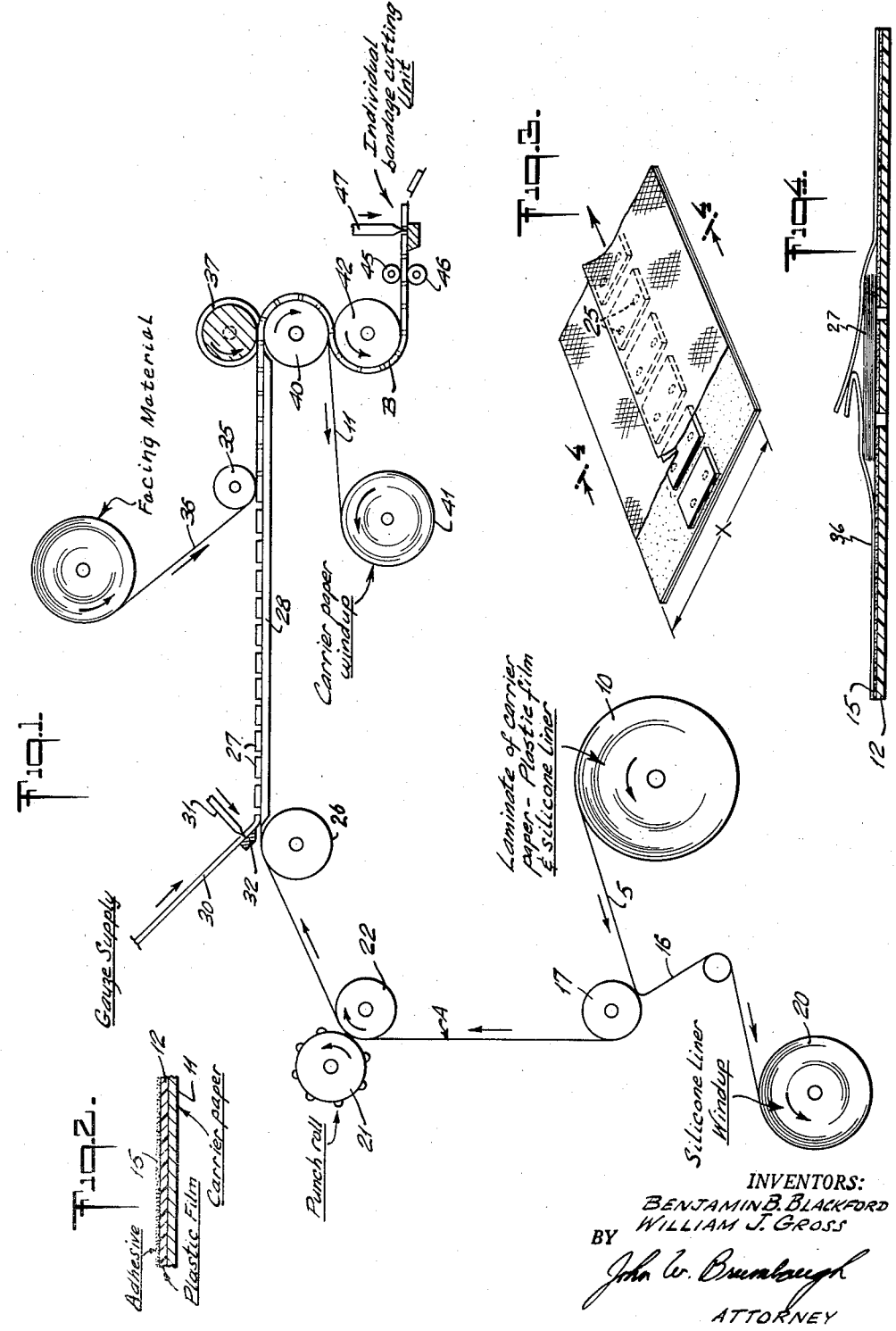
INVENTORS:
BENJAMIN B. BLACKFORD
WILLIAM J. GROSS
BY
ATTORNEY

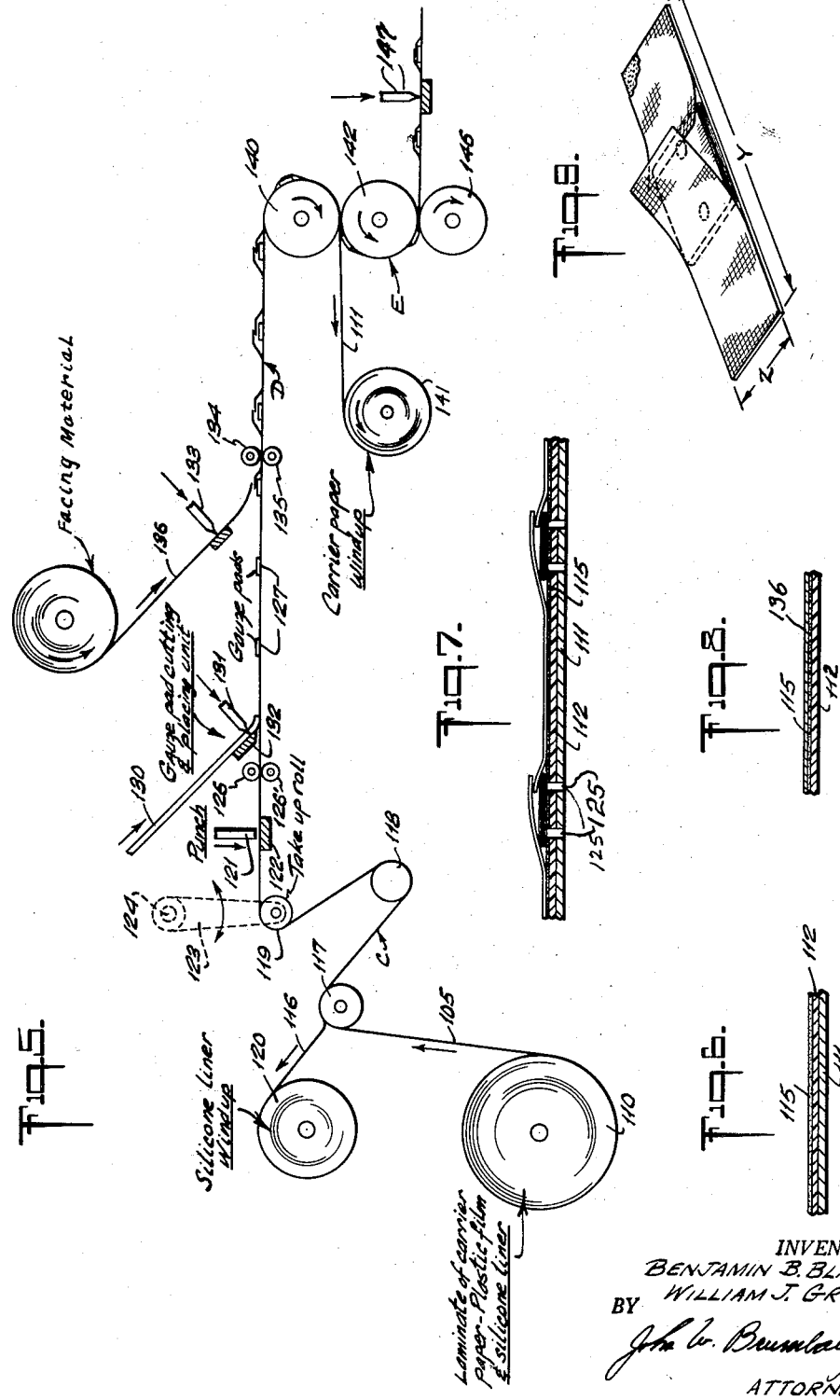

Dec. 2, 1958   B. B. BLACKFORD ET AL   2,862,846
METHOD OF MAKING PLASTIC STRIP ADHESIVE BANDAGES
Filed Nov. 23, 1953   3 Sheets-Sheet 3
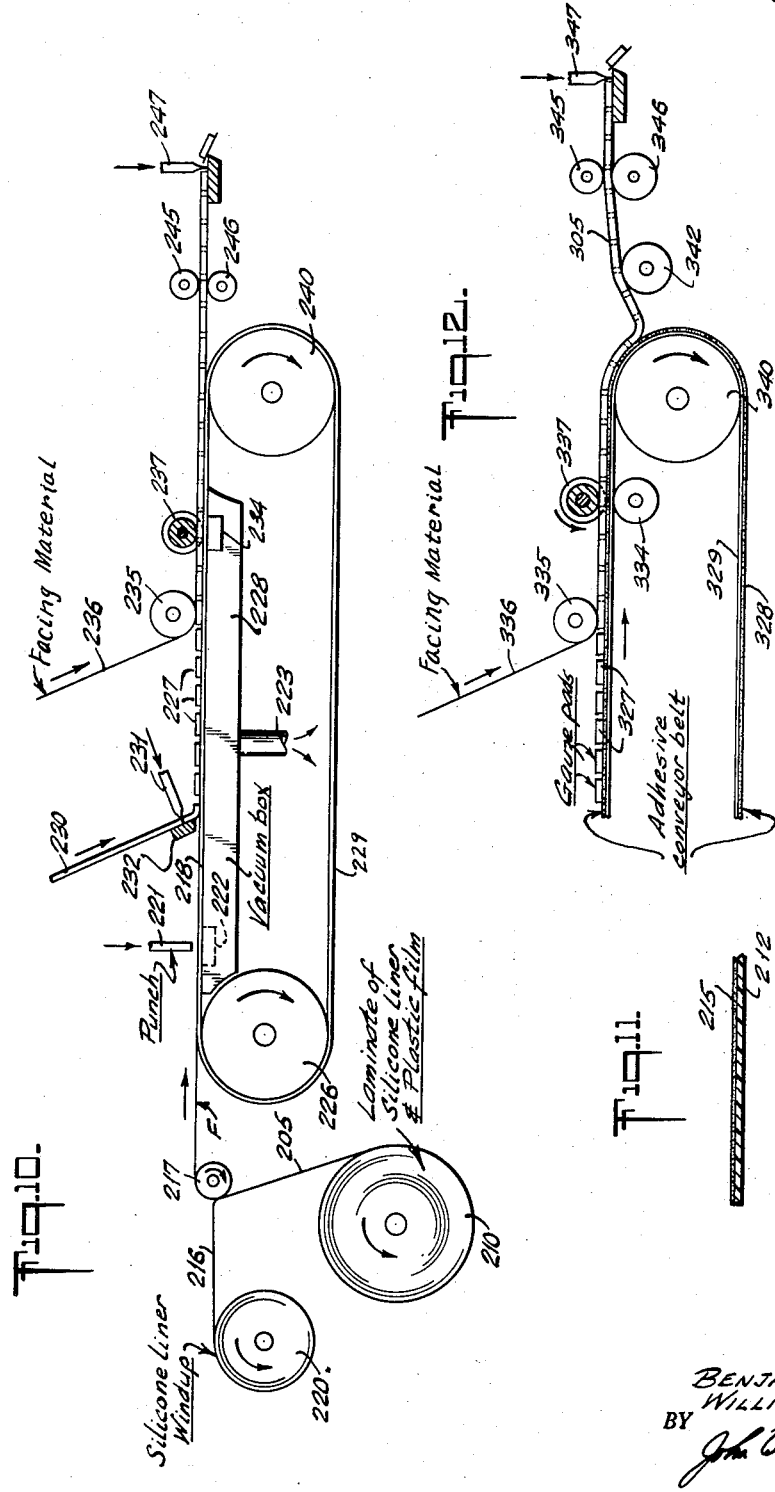
INVENTORS:
BENJAMIN B. BLACKFORD
WILLIAM J. GROSS
BY
ATTORNEY

United States Patent Office 2,862,846
Patented Dec. 2, 1958

2,862,846

METHOD OF MAKING PLASTIC STRIP ADHESIVE BANDAGES

Benjamin B. Blackford, Metuchen, and William J. Gross, Franklin Township, Somerset County, N. J., assignors to Johnson & Johnson, a corporation of New Jersey Application November 23, 1953, Serial No. 393,718

15 Claims. (Cl. 154—118)

This invention relates to the manufacture of adhesive bandages formed with a backing of dimensionally unstable plastic sheet material, otherwise known as "plastic strip" adhesive bandages.

Introduction of "plastic strip" adhesive bandages (i. e., bandages composed of a backing of plastic sheet material coated with pressure-sensitive adhesive with a gauze pad fastened to the adhesive and protective crinoline overlying the pad and adhesive) to the public and their marked commercial success has raised many problems with regard to how these bandages may be manufactured inexpensively and in large quantity. The outstanding success and wide acceptance of the bandage by the general public has been said due in large part to the elastic and dimensionally unstable, i. e. easily extensible, nature of the backing, which permits the bandage to conform readily to the various extremities of the body, particularly to accommodate the joints. Dimensional instability (easy extensibility) has, however, introduced serious problems in manufacturing the bandages rapidly in large quantities and at a low cost. This has been thought to be due largely to local distortion of the backing material under traction strains while in the adhesive bandage machines, which distortion is quite inconsistent with the close tolerances which are nearly always inherent in modern machines adapted for rapid manufacture of adhesive bandages of high quality. Specifically, such distortion, though possibly small in magnitude, frequently has caused adhesive bandages to have non-uniform dimension in the direction of travel of the bandage material through the machine, resulting in sub-standard production.

Objects of the present invention include developing a method and means for solving problems which have been encountered in the manufacture of "plastic strip" adhesive bandages set forth above, and in particular the development of a way to make the plastic backing material more dimensionally stable, i. e. inextensible, so that it may be more effectively processed.

The manner in which the invention fulfills the foregoing objects may be understood by reference to the attached drawings in conjunction with the following description.

Fig. 1 is a schematic drawing of the apparatus used for manufacturing adhesive bandages according to the invention method showing the arrangement of the various parts and the sheet material being processed.

Fig. 2 is a sectional view of the laminate at point A in Fig. 1.

Fig. 3 is a perspective view partly broken away of a portion of the laminate as it appears at point B in Fig. 1.

Fig. 4 is a section of the laminate taken on plane 4—4 of Fig. 3.

Fig. 5 is a schematic diagram of the apparatus and process material in a modified form of the invention.

Fig. 6 is a section of the laminate as it appears at point C in Fig. 5.

Fig. 7 is a longitudinal section of the laminate as it appears at point D in Fig. 5.

Fig. 8 is a sectional view of the laminate at point E in Fig. 5.

Fig. 9 is a perspective view of a completed adhesive bandage after being severed from the continuous web.

Fig. 10 is a schematic illustration of the apparatus and process material according to a further modification of the invention.

Fig. 11 is a section of the process material at point F in Fig. 10.

Fig. 12 illustrates a modification of the technique described in Fig. 10.

Referring to Fig. 1, reference number 10 designates a roll of a continuous web or sheet of laminate material 5. The width of laminate 5 corresponds to the length of an individual adhesive bandage shown as dimension X in Fig. 3. The laminate is formed from a layer of substantially inextensible carrier material such as paper shown at 11 in Fig. 2. This layer is suitably 0.003 to 0.012 inch thick, and may be any of the types of paper known in the art of vinyl film casting, such as urea formaldehyde coated supercalendered kraft. Superimposed on the carrier paper, and adhering thereto by slight but not excessive adhesive force is a layer of plastic film 12, which may be 0.001 to 0.010 inch thick, having tensile strength of 1200 to 6000 p. s. i., and elasticity of 100% to 600% at break. Plastic film 12 is suitably formed of a vinyl type plastic such as polyvinyl chloride compounded in known manner with other materials such as plasticizers, stabilizers, etc. An important characteristic is its dimensional instability, i. e., stretchability, which characteristic helps make the film suitable as backing material for adhesive bandages. Film 12 is provided on its top surface with a thin layer of adhesive 15, which adhesive may be a compounded mixture containing the usual rubber base, tackifier, plasticizer, etc. Superimposed on adhesive layer 15 is a layer of liner paper 16, not shown in Fig. 2, preferably treated with material such as a silicone polymer, which serves to prevent sticking of adhesive layer 15 to other layers of the laminate in roll 10. The laminate is withdrawn from roll 10, preferably continuously, and passed around guide roll 17, at which point liner paper 16 is withdrawn as shown and wound up on roll 20. Web 5 continues between punch roll 21 and anvil roll 22, at which point vent holes 25, best seen in Fig. 3, are punched through the laminate. Web 5 thereafter passes over roll 26, where it picks up gauze pads 27 and meets supporting table 28. Pads 27 are formed from a continuous strip or multiple of strips 30 of gauze folded by means not shown on the drawing and severed by knife means shown schematically at 31, which co-acts with anvil 32. To avoid protrusion of frayed ends at the sides of the bandages, the gauze strip is preferably laid on web 5 transversely and the severing action made parallel to the longitudinal dimension of the web. The pads are placed closely adjacent to one another so that by severing the laminate transversely thereof and between the pads, adhesive bandages having the proper width will be formed.

Laminate 5 continues its travel along table 28 and reaches roll 35 where two continuous strips of sheet facing material 36 are added, one on each side of the row of gauze pads 27 and overlapping near the center of the laminate as shown in Figs. 3 and 4. The laminate then passes between plaster pull rolls 37 and 40, which may be suitably knurled to assure positive motion. The upper pull roll 37 has a receded center portion to accommodate the gauze pads placed near the center of web 5. The endwise protruding portions of the roll surface thereby serve in cooperation with lower pull roll 40 to press facing strips 36 to a substantial degree into intimate contact with adhesive mass 15 on either side of the centrally disposed row of gauze pads 27 to form a composite layer.

As laminate 5 passes around roll 40 it is formed of a bottom layer of carrier paper, a layer of plastic film having an adhesive surface, a row of gauze pads, and a layer of facing sheet covering and pressed to a substantial degree into the adhesive. After the web rounds roll 40, carrier paper 11 is removed and wound up on roll 41. Therefore, as the web 5 rounds roll 42, which is disposed below roll 40, it is no longer supported by the inextensible carrier paper 11. It is formed as shown in Figs. 3 and 4 by a lamination of plastic film, adhesive, gauze pads, and facing. The inextensibility of the laminate 5 at this point, therefore, is supplied by facing 36.

The laminate is removed from roll 42 by metering rolls 45 and 46, which feed the web at a uniform rate into individual bandage-cutting unit 47. Cutting unit 47 is geared with metering rolls 45 and 46 to provide for transverse severing of the web periodically at uniformly spaced intervals measured along the length of the web. However, inextensibility of the web is necessary for accurate coordination between the metering rolls and cutting unit 47. This inextensibility, after removal of carrier paper 11, is provided by facing layer 36.

Although adhesive mass 15 has been described as being a layer coated upon the surface of plastic film 12, the invention is not limited to this arrangement. The principle of the present invention applies to the use of plastic films which have one surface inherently of an adhesive nature, thereby eliminating the necessity for applying a separate layer of adhesive. In certain cases it may be desirable to employ an adhesive which, instead of being pressure-sensitive, is activated, for example, by heat. The principles of the invention apply also to the use of plastic film having the latter type adhesive properties, in which case suitable activating means, such as heaters, would be supplied in the region of pull rolls 37 and 40 of Fig. 1, so that the facing strips will be appreciable intimately joined to the adhesive surface to impart inextensibility to the laminate.

Suitable facing materials include the conventional crinoline and, in addition, facings which have a continuous smooth surface adapted to be placed adjacent the adhesive, the surface being substantially inert to the adhesive properties of the mass. Films made of plasticized polyvinyl chloride resins, preferably coated on paper, afford suitable facing sheets for use in the invention method. The facing surface, in addition to being smooth, is preferably glossy. The facing should have high strength, particularly tear strength, to permit removal from the adhesive without breaking or tearing. Substantial nonextensibility of the facing is, of course, an important requisite for the invention method. Films of high molecular weight polyester of terephthalic acid and a dihydric alcohol such as ethylene glycol, described in the copending application of Sellars and Blackford, Ser. No. 345,124, filed March 27, 1953, now abandoned, furnish another example of a type of film which is sufficiently nonextensible for invention purposes. Another type of facing is cellulose acetate or cellophane. The polyester described, cellulose acetate or cellophane, may be utilized as a free unsupported film or as a laminate with paper. Additional examples of facing materials having smooth continuous facings suitable for invention purposes are alkyd resin-coated papers, urea formaldehyde resin-coated papers, melamine formaldehyde resin-coated papers, polyethylene-coated papers and polyvinyl alcohol-coated papers. Other polymeric materials such as styrene resins and ethyl cellulose may also be used as film-forming materials to furnish the smooth continuous surface adapted to contact the adhesive mass.

The inextensible facing 36 is pressed into intimate contact with the adhesive surface 15 by means of pressure exerted between rolls 37 and 40, as previously indicated.

The inextensibility of the facing is thereby imparted to the composite web, including extensible backing material 12. In the event crinoline is employed as facing, the crinoline will be appreciably embedded in the adhesive surface to impart inextensibility to the laminate.

The term "embedded" is used to describe the relationship of the crinoline to the adhesive mass. However, it is not intended thereby to indicate that the crinoline is completely submerged in the adhesive. Preferably the crinoline should extend appreciably below the surface of the adhesive mass to an extent sufficient to impart inextensibility to the laminate. However, since the crinoline is designed eventually to be removed from the adhesive bandage before use, it should not be embedded to a degree such that removal will be difficult.

The backing materials to which the invention method is directed are elastic and easily extensible materials. By "easily extensible" is meant those materials having an elongation of at least 50% at 5.0 lbs. per inch width tension when elongated at the rate of 20 inches per minute after conditioning at 70° F. and 65% relative humidity. Local distortion of materials having this degree of extensibility under traction strains while being processed in precision machinery raises problems in manufacture of products having close tolerance and high quality.

A somewhat modified embodiment of the invention is described in Fig. 5 in which the continuous laminate 105 of carrier paper 111, plastic film 112, adhesive 115 and silicone liner paper 116 is unwound continuously from roll 110, passed over guide roll 17 where liner paper 116 is stripped off and wound on roll 120 as shown. In this embodiment, the width of web 105 is equal to the width of an individual adhesive bandage; that is, dimension Z in Fig. 9, thereby differing from the procedure just described. The web then passes around guide roll 118 and take-up roll 119 which operates on reciprocating arm 123 and pivoted at 124 as shown. The function of roll 119 and arm 123 is to transform the continuous motion of web 105 as it is withdrawn from roll 110 into intermitent motion in operation subsequent to roll 119. The web, now in intermittent motion imparted by pull rolls 126 and 126', passes between punch 121 and anvil 122, where vent holes 125 are punched. The web 105 then passes beneath gauze pad cutting and placing unit 131, which functions in coordination with the intermittent motion of the web to place a newly cut gauze pad severed from a continuous strip of folded mulitple-layer gauze 130 on the adhesive surface at intervals approximating the length of an individual adhesive bandadge. The laminate, now containing gauze pads 127, continues its travel along supporting guides not shown until it reaches the proximity of facing sheet cutting and placing unit 133. At this point facing 136, unwound from the supply roll, is severed transversely at 133, and the severed segments are placed longitudinally on laminate 105 by means not shown so that adjacent strips of facing overlap to an appreciable extent in the region of the individual gauze pads 127, as shown more clearly in Fig. 7. The laminate then passes between pull rolls 134 and 135, the compression between these rolls being sufficient to press the facing into the exposed areas of adhesive not covered by the individual pads 127, to an appreciable extent to form the composite layer. The web then passes in continued intermittent motion around roll 140 and between this roll and subjacent roll 142, at which point carrier paper 111 is peeled off the laminate and wound up on roll 141. As the laminate passes around roll 140 it is, of course, formed of a bottom layer of carrier paper 111, a superjacent layer of plastic film 112, and a coating of adhesive 115. Embedded into the adhesive to a substantial extent are the individual spaced gauze pads 127. The strips of facing disposed between said pads are in intimate contact with the adhesive, opposite ends of each facing strip overlapping adjacent pads. As the web passes around roll 142 the laminate structure is the same as just described except that the layer of carrier paper 111 is absent, according to the structure illustrated in Fig. 8.

Roll 142 and subjacent roll 146 are preferably knurled so as to provide positive motion of the web with minimum slippage. The laminate passes from the nip of the latter rolls into individual bandage cutting unit 147, where the individual bandages illustrated in perspective in Fig. 9 are formed. The motion of rolls 142 and 146 is co-ordinated with the action of cutting unit 147 so that the intermittent severing action occurs at uniform intervals measured longitudinally along the length of laminate 105. It will now be appreciated that in order to realize uniform longitudinal dimension Y in the individual bandages manufactured, it is necessary to provide inextensibility to the laminate after removal of carrier paper 111. The unsupported vinyl film itself does not possess the requisite inextensibility. The laminate is made inextensible to the required degree by impressing in adhesive mass 115, as described, the strips of inextensible facing which extend between adjacent gauze pads 127.

Another embodiment of the invention is described in Fig. 10. The continuous laminate 205, formed in this case of plastic film 212, adhesive 215, and silicone-treated liner paper 216 without any carrier paper, is unwound from roll 210. Silicone liner paper 216, removed at roll 217, is wound up on roll 220.

At 229 is shown a continuous belt which is permeable to the flow of air therethrough under pressure, e. g., as by numerous small apertures therein. Belt 229 is formed preferably of two longitudinal co-planar sections which are preferably held positively relative to each other by suitable spacers. The overall width of the belt, including both sections and the space therebetween is at least as wide and preferably about co-extensive with the width of web 205. Each belt section preferably approximates the width of exposed adhesive on either side of the row of pads 227 to be subsequently placed upon web 205. Belt 229 moves continuously around drums 226 and 240. The upper reach of belt 229 is supported on the top surface 218 of elongated vacuum box 228. Vacuum box 228 is provided with discharge pipe 223 which leads to mechanism not shown for providing exhaust of air through pipe 223. Box 228 is preferably formed in two elongated sections providing two elongated top horizontal co-planar surfaces with a space between. Said top surfaces are perforated to permit flow of air through them, and the intervening space is preferably imperforate. The width of each perforated section of top surface 218 is preferably about co-extensive with the superjacent section of belt 229 and with continuous areas of vinyl film 212 thereabove adjacent the edges of the film. Permeable belt 229, in its travel across the upper reach above vacuum box 228, therefore, is held against top surface 218 of the box by suction.

Laminate 205 first contacts belt 229 in the proximity of cylinder 226. The web travels with the belt, and the two reach a point above vacuum boxes 228. At this point laminate 205 is held down against belt 229 just as belt 229 is held against top surface 208 of box 228, thereby imparting inextensibility to the otherwise easily extensible laminate. The continuously moving laminate passes between the intermittently operating punch 221 and anvil 222, which are disposed in the area between the two segments of vacuum box 228. The punch motion is coordinated with the movement of belt 229 and forms suitably placed and uniformly spaced vent holes similar to vent holes 25 in Fig. 3. The belt-supported laminate then passes beneath the gauze pad cutting and placing unit consisting of knife 231 and anvil 232, where the individual pads 227 are severed from a continuous folded multiple layer strip 230. These pads are placed on laminate 205 in fashion similar to that described in Figs. 1 and 3, that is, closely spaced and transverse to the longitudinal dimension of the laminate. At facing guide roll 235 two continuous strips of facing 236 are placed on the top surface of laminate 205 in such a manner that their central edges overlap in the region of the line of pads 227, and their outside edges substantially coincide with the outside edges of laminate 205. Roll 237 is formed similarly to roll 37 of Fig. 1, that is, it is provided with a centrally disposed annular recess to accommodate line of pads 227. The relatively projecting portions at the ends of roll 237 bear against the portions of the two facing strips which do not overlie the gauze pads, thereby forcing the facing to a substantial extent into adhesive mass 215 of laminate 205. Stationary anvil 234 affords a backing support for roll 237.

After the continuously moving laminate passes the edge of vacuum box 228, the adhesion between laminate 205 and belt 229 is removed. The two are therefore separated at cylinder 240, and the laminate passes between metering rolls 245 and 246, and thence into individual bandage cutting unit 247. Similar to the cutting units described in Figs. 1 and 5, cutting unit 247 is coordinated with the motion of metering rolls 245 and 246, so that a severing action is obtained at intervals which are uniform along the longitudinal dimension of the laminate 205. Facing layer 236 joined intimately with adhesive 215 imparts inextensibility to laminate 205, which is requisite to proper coordination of rolls 245 and 246 with cutting unit 247 to provide individual bandages having uniform dimension in the direction of the longitudinal dimension of laminate 205.

Modification of Fig. 10 technique is illustrated in Fig. 12. Here a belt 329 is employed which has a permanent coating of pressure-sensitive adhesive 328 on its outside surface. This belt travels around drum 340 and another drum not shown to provide an upper and lower reach of the belt. The laminate, which is formed merely of vinyl film and an adhesive coating thereon, as described in Fig. 11, i. e., without carrier paper, is removably supported on belt 329 and receives inextensibility from said belt by action of adhesive layer 328. In the Fig. 12 illustration, the individual gauze pads 327 are shown as already placed upon laminate 305 just as in Figs. 1 and 10. The two strips of facing appear at 336 and pass beneath facing guide roll 335, where they contact the exposed layer of adhesive 215 on vinyl film 212 and the placed gauze pads 327. The composite laminate 305 and carrier belt 329 pass between rolls 337 and 334. Roll 337 is formed and functions in a manner similar to roll 237 of Fig. 10. The two facing strips 336 therefore are pressed into the exposed areas of adhesive 215 on opposite sides of the row of pads 327, the pressure being applied between the endwise portions of roll 337 and roll 334. The temporary adhesive bond between continuous belt 329 and laminate 305 is terminated by a stripper roll 342, which feed the laminate, now rendered substantially inextensible by reason of the strips of inextensible facing adhering to the exposed adhesive areas of laminate 305, between the metering rolls 345 and 346. The metering rolls cooperate with the cutting unit 347 to produce individual adhesive bandages having a substantially uniform dimension in the direction of travel of laminate 305, just as in the previously described apparatus and procedures.

The invention is illustrated but not limited by the following examples:

*Example 1*

A laminate of carrier paper, plastic film containing a coating of adhesive on the surface opposite the carrier paper, and silicone liner paper covering said ahesive was unwound from roll 10 in Fig. 1. The paper was about 3 inches wide, 0.008 inch thick and of urea-formaldehyde coated kraft type. The vinyl film was 0.004 inch thick, also about 3 inches wide, and approximately co-extensive with the carrier paper. The vinyl film was easily extensible, i. e., had 100% elongation at 1800 lbs.

per square inch measured under the standard conditions set forth above, and was composed of about 58% polyvinyl chloride resin, about 34% plasticizers, about 6% pigment, and the balance stabilizer. The carrier paper was secured to the vinyl film by an easily frangible adhesive bond, such as may be secured by pressure, or heat and pressure, or a lightly tacky adhesive mass. The adhesive coating composition consisted of about 24% rubbery-type material, about 33% resin tackifier, about 8% plasticizer, about 35% pigment such as zinc oxide and titanium dioxide, and a small amount of stabilizer. The liner paper was thermoset silicone-treated parchment which was highly repellent to the pressure-sensitive adhesive mass layer. The liner was about 3 inches wide, i. e., co-extensive with the plastic film and carrier paper. The laminate was passed around roll 17, where liner paper 16 was removed and thence between punch roll 21 and anvil roll 22, where pairs of holes 25 were punched through the complete laminate at uniform intervals. Gauze strip 30 formed from two strips folded into six plies about 0.7 inch wide was severed at 31 into individual pads one inch long, which were laid transversely across laminate 5 with a space of about one-quarter inch between the pads. Two strips of facing were added at roll 35 in the manner illustrated in Fig. 3, which facing was pressed into adhesive mass 15 on plastic film 12 between pull rolls 37 and 40. Carrier paper 11 was removed near the nip of rolls 40 and 42 and wound on roll 41. The laminate, minus the carrier paper, was passed through metering rolls 45 and 46 and thence through individual bandage cutting unit 47. Bandages having substantially uniform width and pads located substantially at the center (measured widthwise and lengthwise) of the plastic strip were formed.

*Example 2*

A laminate of carrier paper, adhesive-coated plastic film, and silicone liner paper similar to that described in Example 1 but having a width equal to the width of an individual adhesive bandage was unwound from roll 110 in Fig. 5. Liner paper was peeled off at roll 117. The remaining laminate was punched for vent holes at 121, and individual gauze pads were placed on the upfacing adhesive surface at 131 at intervals approximating the length of individual adhesive bandages. Strips of facing were severed at 133 and pressed on the intermittently moving web so that the ends of each facing strip overlapped the adjacent dressing pads as shown in Fig. 7. The facing was pressed to an appreciable extent into the surface of exposed areas of adhesive between the pads by the pressure of rolls 134 and 135. The carrier paper was peeled off the laminate after passing around roll 140. The unsupported laminate, now rendered substantially inextensible by the facing, passed between rolls 142 and 146 and was cut at intervals midway between the pads to form individual bandages. The bandages were found to be substantially uniform in length. The dressing pads were substantially in the center of the strip.

*Example 3*

A laminate of carrier paper, adhesive-coated plastic film and silicone liner paper, similar to that employed in Example 2, was unwound from roll 110 in Fig. 5. Liner paper was peeled off at roll 117. The remaining laminate was punched for vent holes at 121 and individual gauze pads were placed on the up-facing adhesive surface at 131 at intervals approximating the length of individual adhesive bandages. Facing material 36 employed consisted of a laminated sheet one mil thick of cellulose triacetate film adhesively bonded to paper 3 mils thick. Strips of this facing were severed at 133 and pressed on the intermittently moving web with the cellulose triacetate adjacent the adhesive so that the ends of each facing strip overlapped the adjacent dressing pads as shown in Fig. 7. The facing was pressed into intimate contact with the exposed areas of adhesive between the pads by the pressure of rolls 134 and 135. The carrier paper was peeled off the bottom of the backing sheet, after passing around roll 140. The unsupported laminate, now rendered substantially inextensible by the facing, passed between rolls 142 and 146, and was cut at intervals midway between the pads to form individual bandages. The bandages were found to be substantially uniform in length, and the dressing pads in substantially the center of each strip.

*Example 4*

Example 3 was repeated except that the laminate of paper-acetate film facing material of Example 3 was replaced with a free film (unlaminated) of the same cellulose triacetate film having 1.0 mil thickness. The bandages formed were found to be substantially uniform in length, and the dressing pads substantially in the center of each strip.

*Example 5*

Example 3 was repeated except that the laminate of paper-acetate facing material of Example 3 was replaced with paper 4.5 mils thick which was coated on one side with a plasticized polyvinyl chloride film approximately one mil thick applied to the paper by spreading thereon an organosol suspension having the following composition:

| | Parts by weight |
|---|---|
| Polyvinyl chloride resin of the organosol type | 100 |
| Nonmigratory polyester plasticizer | 26 |
| Titanium dioxide | 14 |
| "Apco" thinner, an aliphatic hydrocarbon mixture (B. P. 125–165° C.) | 19 |
| Diisobutyl ketone | 6 |

After spreading, the film was dried for 10 minutes in an oven at 60° C. and then fused in an oven at 180° C. for three minutes. The bandages prepared were found to be substantially uniform in length and the dressing pads were substantially in the center of each strip.

*Example 6*

Example 3 was repeated replacing the paper-acetate facing with a free (unsupported) polyester film, described in co-pending application Serial No. 345,124, mentioned above. The bandages formed were substantially uniform in length, and the dressing pads substantially in the center of each strip.

Although the embodiments of the invention described have called for transverse severing of the laminate of extensible film backing, adhesive, and facing, the transverse severing is not a limiting factor. If desired, the laminate may be cut in circular, square, or other shapes to form, for example, "spot" or "patch" dressings. In each case, however, it will be necessary to coordinate the action of the cutter with the position of the absorbent dressing so that the latter will be in the desired position, e. g. center, on the adhesive bandage. Hence, in these other embodiments inextensibility imparted to the plastic film by the facing is still important.

The term "adhesive bandage" as used herein and in the appended claims is intended to include not only the familiar strip-type bandage but also other types of adhesive dressings, that is, dressings having a backing of adhesive-containing material with a pad disposed thereon. Manufacture of the "spot" and "patch" dressings are included. The principles of the invention will also be found to be applicable to the manufacture of other products of uniform dimension from a dimensionally unstable sheet material.

The forms of the invention described above by example, description and drawing are merely illustrative and not limiting, since equivalent modifications and variations will be apparent.

This application is a continuation-in-part of our copending application Serial No. 301,591, filed July 29, 1952, now abandoned.

The claims are:

1. The method for making individual products having uniform dimensions from easily extensible sheet material which comprises supporting a continuous moving web of said sheet material by removable contact of one surface thereof with a substantially inextensible continuous carrier sheet, the opposite surface of said extensible sheet having pressure sensitive adhesive properties, placing a second web of substantially inextensible sheet material on said adhesive surface to form a composite layer, uniting said second inextensible web with said adhesive surface, removing said carrier sheet from said web of extensible material, and then periodically cutting said composite layer to form said individual products of extensible sheet material, said products having uniform dimension in the direction of movement of said webs.

2. The method for making adhesive bandages having a backing of easily extensible sheet material which comprises supporting a web of said sheet material by removable contact of one surface thereof with a substantially inextensible carrier sheet, the opposite surface of said extensible sheet having pressure-sensitive adhesive properties, placing an absorbent dressing material on said pressure-sensitive surface, said dressing material covering a portion only of said sensitive surface, placing a web of substantially inextensible facing material on said sensitive surface, pressing said facing into intimate contact with said pressure-sensitive surface, removing said carrier sheet from said web of extensible material, and thereafter cutting said extensible sheet and facing to form individual adhesive bandages.

3. The method for making adhesive bandages having a backing of easily extensible sheet material which comprises supporting a web of said sheet material by removable contact of one surface thereof with a substantially inextensible carrier sheet, the opposite surface of said extensible sheet having pressure-sensitive adhesive properties, placing an absorbent dressing material on said pressure-sensitive surface, said dressing material covering a portion only of said sensitive surface, placing a web of substantially inextensible facing material having a smooth continuous surface on said sensitive surface, pressing said facing into intimate contact with said pressure-sensitive surface, removing said carrier sheet from said web of extensible material, and thereafter cutting said extensible sheet and facing to form individual adhesive bandages.

4. The method for making adhesive bandages having a backing of easily extensible sheet material which comprises supporting a web of said sheet material by removable contact of one surface thereof with a substantially inextensible carrier sheet, the opposite surface of said extensible sheet having pressure-sensitive adhesive properties, placing an absorbent dressing material on said pressure-sensitive surface, said dressing material covering a portion only of said sensitive surface, placing a web of crinoline on said sensitive surface, pressing said crinoline at least part way into said pressure-sensitive surface, removing said carrier sheet from said web of extensible material, and thereafter cutting said extensible sheet and crinoline to form individual adhesive bandages.

5. The method for making adhesive bandages having a backing of easily extensible sheet material which comprises supporting a continuous web of said sheet material by removable contact of one surface thereof with a continuous substantially inextensible carrier sheet, the opposite surface of said extensible sheet having pressure-sensitive adhesive properties, placing absorbent dressing pads on said pressure-sensitive surface to form a row near the center thereof, said dressing pads covering a portion only of said sensitive surface, placing a web of substantially inextensible facing material on said uncovered sensitive surface to form a composite layer, pressing said facing into intimate contact with said pressure-sensitive surface, removing said carrier sheet from said web of extensible material, and thereafter cutting said composite layer to form individual adhesive bandages.

6. The method for making adhesive bandages having a backing of easily extensible plastic sheet material which comprises supporting a continuous web of said plastic sheet material by contact of one surface thereof with a substantially inextensible carrier sheet permeable to the flow of air therethrough, applying suction through said carrier sheet to hold said plastic sheet to said carrier sheet, the opposite surface of said plastic sheet having a covering layer of pressure-sensitive adhesive mass, placing absorbent dressing pads on said adhesive mass at spaced intervals along the length of and near the middle of said plastic sheet, thereby leaving exposed areas of pressure-sensitive adhesive adjacent and between individual dressing pads, covering said opposite surface of said plastic sheet including dressing pads and exposed areas of adhesive with substantially inextensible facing sheet to form a composite layer, pressing said facing into intimate contact with said adhesive at the exposed areas, removing said carrier sheet from said plastic sheet and thereafter cutting said composite layer to form adhesive bandages.

7. The method for making adhesive bandages having a backing of easily extensible plastic sheet material which comprises supporting a horizontal continuous web of said plastic sheet material by contact of the bottom surface thereof with a substantially inextensible continuous sheet of carrier paper, the top surface of said plastic sheet having a covering layer of pressure-sensitive adhesive, placing absorbent dressing pads on said adhesive layer at spaced intervals along the length of and near the middle of said plastic sheet, thereby leaving exposed areas of pressure-sensitive adhesive adjacent and between individual dressing pads, covering the top surface of said plastic sheet including dressing pads and exposed areas of adhesive with substantially inextensible facing sheet having a smooth continuous surface to form a composite layer, pressing said facing into intimate contact with said adhesive at the exposed areas, removing said paper from said plastic sheet and thereafter transversely severing said composite layer between the individual dressing pads to form adhesive bandages.

8. The method for making adhesive bandages having a backing of easily extensible plastic sheet material which comprises supporting a horizontal continuous web of said plastic sheet material by contact of the bottom surface thereof with a substantially inextensible continuous sheet of carrier paper, the top surface of said plastic sheet having a covering layer of pressure-sensitive adhesive, placing absorbent dressing pads on said adhesive layer at spaced intervals along the length of and near the middle of said plastic sheet, thereby leaving exposed areas of pressure-sensitive adhesive adjacent and between individual dressing pads, covering the top surface of said plastic sheet including dressing pads and exposed areas of adhesive with crinoline to form a composite layer, pressing said crinoline at least part way into said adhesive at the exposed areas, removing said paper from said plastic sheet and thereafter transversely severing said composite layer between the individual dressing pads to form adhesive bandages.

9. The method for making adhesive bandages having a backing of sheet material which comprises feeding a laminate comprising (1) said sheet material, (2) a substantially inextensible carrier sheet removably secured to one surface of said extensible sheet, and (3) a layer of pressure-sensitive adhesive mass on the opposite surface thereof to a pad-applying station, placing absorbent dressing pads on said pressure-sensitive surface to form a row near the center thereof, said pads covering a portion only of said sensitive surface, placing a web of substantially inextensible facing on the uncovered portion of said sensitive surface to form a composite layer, pressing said facing into intimate contact with said pressure-sensitive surface, removing said carrier sheet from said web of extensible material and thereafter transversely severing said composite layer to form individual adhesive bandages.

10. The method for making adhesive bandages having a backing of easily extensible plastic sheet material which comprises supporting a horizontal continuous web of said plastic sheet material by contact of the bottom surface thereof with a substantially inextensible continuous sheet of carrier paper, the top surface of said plastic sheet having a covering layer of pressure-sensitive adhesive, placing absorbent dressing pads on said adhesive layer at spaced intervals along the length of said plastic sheet, said pads being disposed near the middle of said plastic sheet, thereby leaving continuous exposed areas of pressure-sensitive adhesive adjacent to both edges of said plastic sheet, covering the top surface of said plastic sheet including dressing pads and exposed areas of adhesive with a continuous web of substantially inextensible facing sheet having a smooth continuous surface to form a composite layer, pressing said facing into intimate contact with said adhesive at the exposed areas, removing said paper from said plastic sheet and thereafter transversely severing said composite layer between the individual dressing pads to form adhesive bandages.

11. The method for making adhesive bandages having a backing of easily extensible plastic sheet material which comprises supporting a horizontal continuous web of said plastic sheet material by contact of the bottom surface thereof with a substantially inextensible continuous sheet of carrier paper, the top surface of said plastic sheet having a covering layer of pressure-sensitive adhesive, placing absorbent dressing pads on said adhesive layer at spaced intervals along the length of said plastic sheet, said pads being disposed near the middle of said plastic sheet, thereby leaving continuous exposed areas of pressure-sensitive adhesive adjacent to both edges of said plastic sheet, covering the top surface of said plastic sheet including dressing pads and exposed areas of adhesive with a continuous web of crinoline to form a composite layer, pressing said crinoline at least part way into said adhesive at the exposed areas, removing said paper from said plastic sheet and thereafter transversely severing said composite layer between the individual dressing pads to form adhesive bandages.

12. The method for making adhesive bandages having a backing of easily extensible plastic sheet material which comprises supporting a horizontal continuous web of said plastic sheet material by contact of the bottom surface thereof with a substantially inextensible continuous sheet of carrier paper, the top surface of said plastic sheet having a covering layer of pressure-sensitive adhesive, placing absorbent dressing pads on said adhesive layer at spaced intervals along the length of said plastic sheet, said pads being disposed near the middle of said plastic sheet, thereby leaving a continuous exposed area of pressure-sensitive adhesive adjacent to each edge of said plastic sheet, covering each of said exposed areas with a continuous web of substantially inextensible facing material having smooth continuous surface to form a composite layer, said facing webs overlapping above said dressing pads, pressing said facing webs into intimate contact with said adhesive at the exposed areas, removing said paper from said plastic sheet and thereafter transversely severing said composite layer between the individual dressing pads to form adhesive bandages.

13. The method for making adhesive bandages having a backing of easily extensible plastic sheet material which comprises supporting a horizontal continuous web of said plastic sheet material by contact of the bottom surface thereof with a substantially inextensible continuous sheet of carrier paper, the top surface of said plastic sheet having a covering layer of pressure-sensitive adhesive, placing absorbent dressing pads on said adhesive layer at spaced intervals along the length of said plastic sheet, said pads being disposed near the middle of said plastic sheet, thereby leaving a continuous exposed area of pressure-sensitive adhesive adjacent to each edge of said plastic sheet, covering each of said exposed areas with a continuous web of crinoline to form a composite layer, said crinoline webs overlapping above said dressing pads, pressing said crinoline webs at least part way into said adhesive at the exposed areas, removing said paper from said plastic sheet and thereafter transversely severing said composite layer between the individual dressing pads to form adhesive bandages.

14. The method for making adhesive bandages having a backing of easily extensible plastic sheet material, which comprises supporting a horizontal continuous web of said plastic sheet material approximating the width of an individual adhesive bandage by contact of the bottom surface thereof with a substantially inextensible continuous sheet of carrier paper, the top surface of said plastic sheet having a covering layer of pressure-sensitive adhesive, placing absorbent dressing pads on said adhesive layer at spaced intervals along the length of said plastic sheet approximating the length of a completed individual bandage, thereby leaving exposed areas of pressure-sensitive adhesive between individual dressing pads, covering each of said exposed areas with strips of substantially inextensible facing, the ends of which overlap adjacent pads to form a composite layer, pressing said facing into intimate contact with said adhesive at the exposed areas, removing said paper from said plastic sheet, and thereafter transversely severing said composite layer between the individual dressing pads to form adhesive bandages.

15. The method for making adhesive bandages having a backing of easily extensible plastic sheet material, which comprises supporting a horizontal continuous web of said plastic sheet material approximating the width of an individual adhesive bandage by contact of the bottom surface thereof with a substantially inextensible continuous sheet of carrier paper, the top surface of said plastic sheet having a covering layer of pressure-sensitive adhesive, placing absorbent dressing pads on said adhesive layer at spaced intervals along the length of said plastic sheet approximating the length of a completed individual bandage, thereby leaving exposed areas of pressure-sensitive adhesive between individual dressing pads, covering each of said exposed areas with strips of crinoline, the ends of which overlap adjacent pads to form a composite layer, pressing said crinoline at least part way into said adhesive at the exposed areas, removing said paper from said plastic sheet, and thereafter transversely severing said composite layer between the individual dressing pads to form adhesive bandages.

References Cited in the file of this patent

UNITED STATES PATENTS

| | | |
|---|---|---|
| 2,029,260 | Eustis et al. | Jan. 28, 1936 |
| 2,484,045 | Morgan | Oct. 11, 1949 |
| 2,596,179 | Seymour | May 13, 1952 |
| 2,607,711 | Hendricks | Aug. 19, 1952 |